United States Patent
Gupta

(10) Patent No.: US 12,050,962 B1
(45) Date of Patent: Jul. 30, 2024

(54) SYSTEM AND METHOD FOR IMPLEMENTING DYNAMIC OPERATION IDENTIFIER

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/351,573

(22) Filed: Jul. 13, 2023

(51) Int. Cl.
*G06K 7/14* (2006.01)

(52) U.S. Cl.
CPC .................................. *G06K 7/1417* (2013.01)

(58) Field of Classification Search
CPC ...................................................... G06K 7/1417
USPC ........................................................ 235/462.1
See application file for complete search history.

(56) References Cited

U.S. PATENT DOCUMENTS

| | | | |
|---|---|---|---|
| 8,315,326 B2 | 11/2012 | Agee et al. | |
| 8,490,861 B1* | 7/2013 | Cidambi | G06F 21/51 235/375 |
| 8,873,853 B2 | 10/2014 | Rodriguez | |
| 8,929,193 B2 | 1/2015 | Branlund et al. | |
| 9,082,052 B2 | 7/2015 | Rodriguez et al. | |
| 9,619,660 B1 | 4/2017 | Felix et al. | |
| 10,469,854 B2 | 11/2019 | Gokhale et al. | |
| 10,715,326 B2 | 7/2020 | Maim | |
| 10,735,436 B1* | 8/2020 | Chernilovsky | G06K 7/1417 |
| 10,869,638 B2 | 12/2020 | Leydon | |
| 11,130,042 B2 | 9/2021 | Tran et al. | |
| 11,290,751 B2 | 3/2022 | Gamei et al. | |
| 11,468,461 B1* | 10/2022 | Anscomb | G06K 7/1417 |
| 11,628,351 B2 | 4/2023 | Tran et al. | |
| 2005/0068360 A1* | 3/2005 | Hess | B41J 13/103 347/16 |
| 2010/0012418 A1 | 1/2010 | Yoshizawa | |
| 2010/0292832 A1* | 11/2010 | Compton | G06Q 10/00 700/215 |
| 2015/0269331 A1* | 9/2015 | Bolanos | G06F 21/34 705/51 |
| 2017/0193445 A1 | 7/2017 | Bolene et al. | |
| 2017/0208151 A1 | 7/2017 | Gil et al. | |
| 2017/0232300 A1 | 8/2017 | Tran et al. | |
| 2018/0069932 A1 | 3/2018 | Tiwari et al. | |
| 2018/0082050 A1* | 3/2018 | Flink | H04L 9/3228 |
| 2019/0205288 A1 | 7/2019 | Faith et al. | |
| 2020/0074962 A1* | 3/2020 | Norieda | G06T 7/70 |
| 2020/0226617 A1* | 7/2020 | Meadow | G06K 19/06037 |
| 2020/0279279 A1 | 9/2020 | Chaudhuri | |

(Continued)

*Primary Examiner* — Allyson N Trail

(57) ABSTRACT

A system for implementing dynamic quick response (QR) code is disclosed. The system scans a first portion of the QR code. In response, the system determines an identifier string encoded in a second portion of the QR code. The system causes transmission of the identifier string to a server, where in response to causing the transmission of the determined identifier string to the server, information that indicates a first pattern associated with a third portion of the QR code is received from the server. The system decodes the first pattern associated with the third portion of the QR code, where the decoded first pattern of the QR code indicates an instruction to be performed. In response, the system determines the instruction in response to decoding the third portion of the QR code and performs the instruction.

20 Claims, 3 Drawing Sheets

(56) References Cited

U.S. PATENT DOCUMENTS

| | | |
|---|---|---|
| 2020/0327225 A1 | 10/2020 | Nguyen et al. |
| 2020/0396065 A1 | 12/2020 | Gutierrez-Sheris |
| 2021/0117780 A1 | 4/2021 | Malik et al. |
| 2021/0377309 A1* | 12/2021 | Jogand-Coulomb ........................ G06K 7/10366 |
| 2022/0091837 A1 | 3/2022 | Chai et al. |
| 2023/0134627 A1* | 5/2023 | Harper ................. G06K 7/1443 382/317 |
| 2023/0267463 A1* | 8/2023 | Appelboom ......... G06Q 20/401 705/44 |
| 2023/0298027 A1* | 9/2023 | Mayo ............... G06Q 20/40145 705/44 |
| 2024/0104593 A1* | 3/2024 | Carpentier ........... G06Q 20/346 |
| 2024/0149601 A1* | 5/2024 | Guzzo ................... B41M 5/502 |

\* cited by examiner

SYSTEM AND METHOD FOR IMPLEMENTING DYNAMIC OPERATION IDENTIFIER

TECHNICAL FIELD

The present disclosure relates generally to information security, and more specifically to a system and method for implementing dynamic operation identifier.

BACKGROUND

People may use operation identifiers, such as quick response (QR) codes, bar codes, and the like to direct users to a particular website or to communicate particular data to user devices that are used to scan the operation identifiers. A bad actor may use a fake QR code or bar code to gain unauthorized access to information associated with users. For example, the fake QR code may lead users who scan the fake QR code to a phishing or malicious website designed to collect private information from the users.

SUMMARY

The system described in the present disclosure is particularly integrated into a practical application of implementing a multi-level information encoding technology in an operation identifier, where each portion of the operation identifier is encoded with a different information and in response to decoding a portion of operation identifier, a next portion is dynamically revealed (e.g., displayed). This, in turn, provides technical improvements and advantages over the current operation identifier implementation techniques. These technical improvements and advantages are described below.

In general, the disclosed system reduces fraudulent activities related to operation identifiers. In some examples, operation identifiers may include a quick response (QR) code, a bar code, a two-dimension image, a three-dimension image, and the like. The operation identifier may interchangeably referred to herein as a QR code. In current approaches, QR code is static—meaning that the QR code is printed or displayed as a non-changing image. Once a QR code is printed or displayed, it cannot be changed. In some cases, a bad actor may use a fake QR code that may resemble a legitimate QR code. The fake QR code may lead users who scan the fake QR code to a phishing or malicious website designed to collect private information from the users. For example, the fake QR code may be placed on a banner, a poster, a flyer, or placed online. In some cases, a malicious QR code may be used to distribute malware or other harmful data to user devices that scan the malicious QR code. For example, when the malicious QR code is scanned, it may include a weblink address to a malware and initiate downloading the malware onto the user device. The malware may be coded to compromise the security of the user device and/or access private information on the user device and/or remotely control the user device. In some cases, a counterfeit QR code may be placed instead of a legitimate QR code. When the counterfeit QR code is scanned by a user device, it would cause the user device to communicate data to another computing device instead of an intended device as indicated by the legitimate QR code.

The present disclosure contemplates unconventional systems and methods to implement dynamic QR code that is practically impossible to be replicated or otherwise accessed to perform fraudulent activities. For example, the dynamic QR code is implemented by multiple encoding levels, where each encoding level is encoded in a different portion of the QR code and provides information to decode a next respective portion of the QR code. An encoding level is unique to each QR code and should be verified by an external computing device (e.g., a server) before providing a QR code pattern of a next respective portion of the QR code and/or information encoded in a next respective portion of the QR code. In another example, different portions of the dynamic QR code are revealed (e.g., displayed) when a respective previous portion is verified and decoded. Therefore, the possibility of accessing and counterfeiting a dynamic QR code is significantly reduced by the disclosed implementation of dynamic QR code. In this manner, the disclosed system reduces fraudulent activities performed by fake QR codes and improves the security and privacy of user devices and user information stored at the user devices that could otherwise be accessed by fake QR codes. In some embodiments, a system of for implementing dynamic QR code comprises a memory and a processor. The memory is configured to store an image of the QR code. The processor is operably coupled with the memory. The processor is configured to scan a first portion of the QR code. In response to scanning the first portion of the QR code, the processor is further configured to determine an identifier string encoded in a second portion of the QR code. The processor is further configured to cause to transmit the determined identifier string to a server, wherein in response to causing to transmit the determined identifier string to the server, information that indicates a first pattern associated with a third portion of the QR code is received from the server. The processor is further configured to decode the first pattern associated with the third portion of the QR code, where the decoded first pattern of the QR code indicates an instruction to be performed. in response to decoding the first pattern associated with the third portion of the QR code, the processor is further configured to determine the instruction in response to decoding the third portion of the QR code and perform the instruction.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
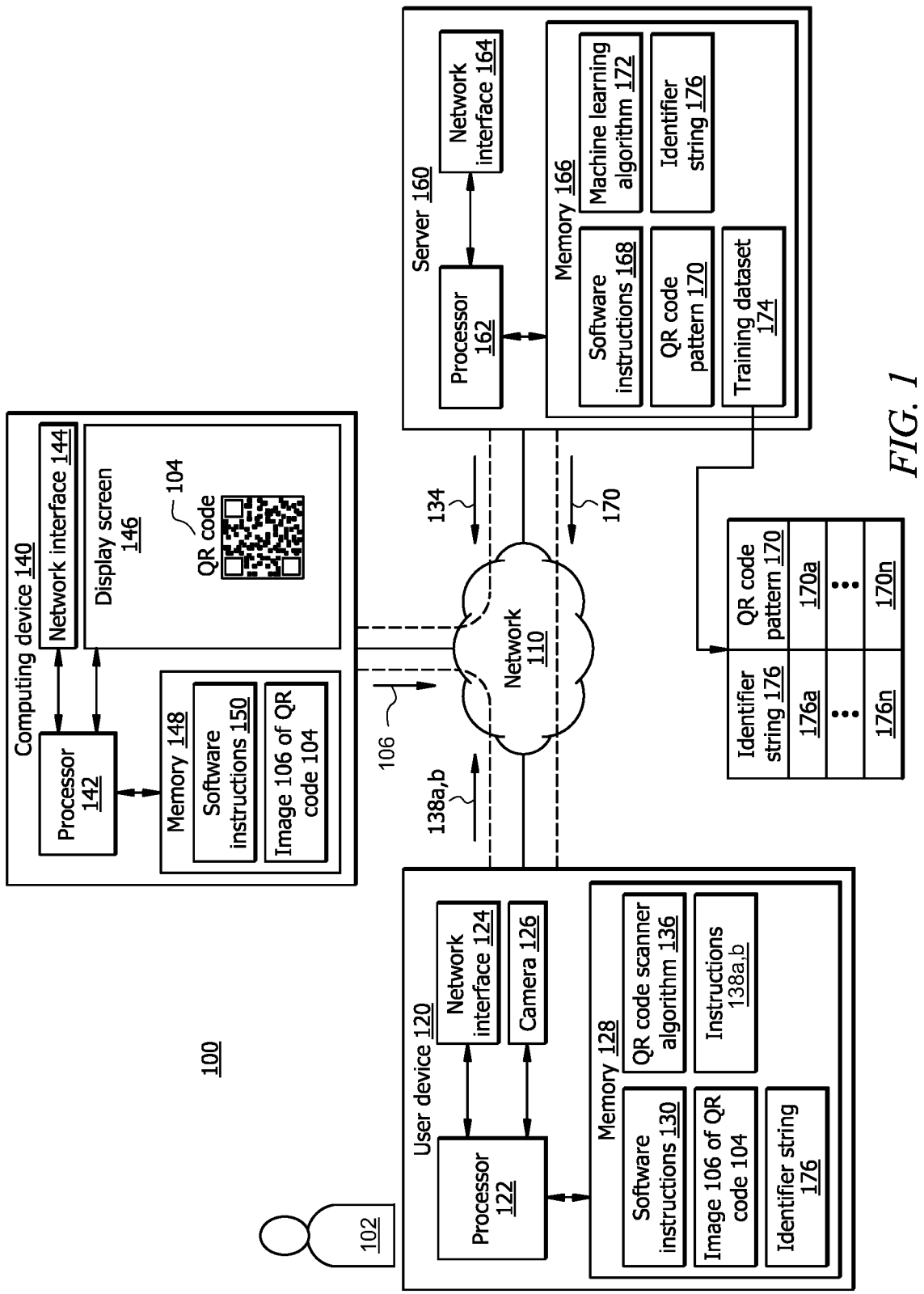
FIG. 1 illustrates an embodiment of a system configured to implement a dynamic operation identifier.
Figure 2:
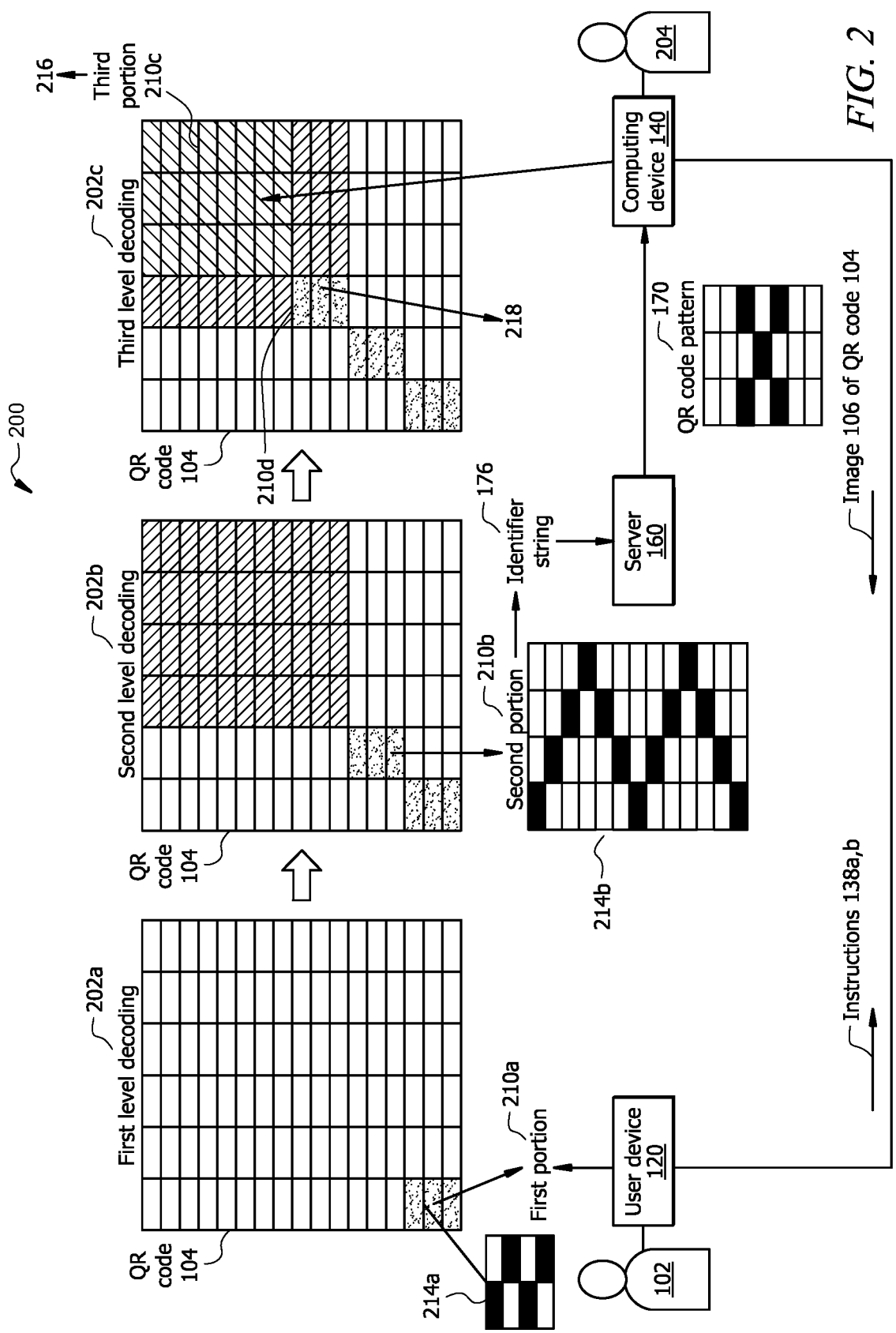
FIG. 2 illustrates an example operational flow of the system of FIG. 1 for implementing a dynamic operation identifier.
Figure 3:
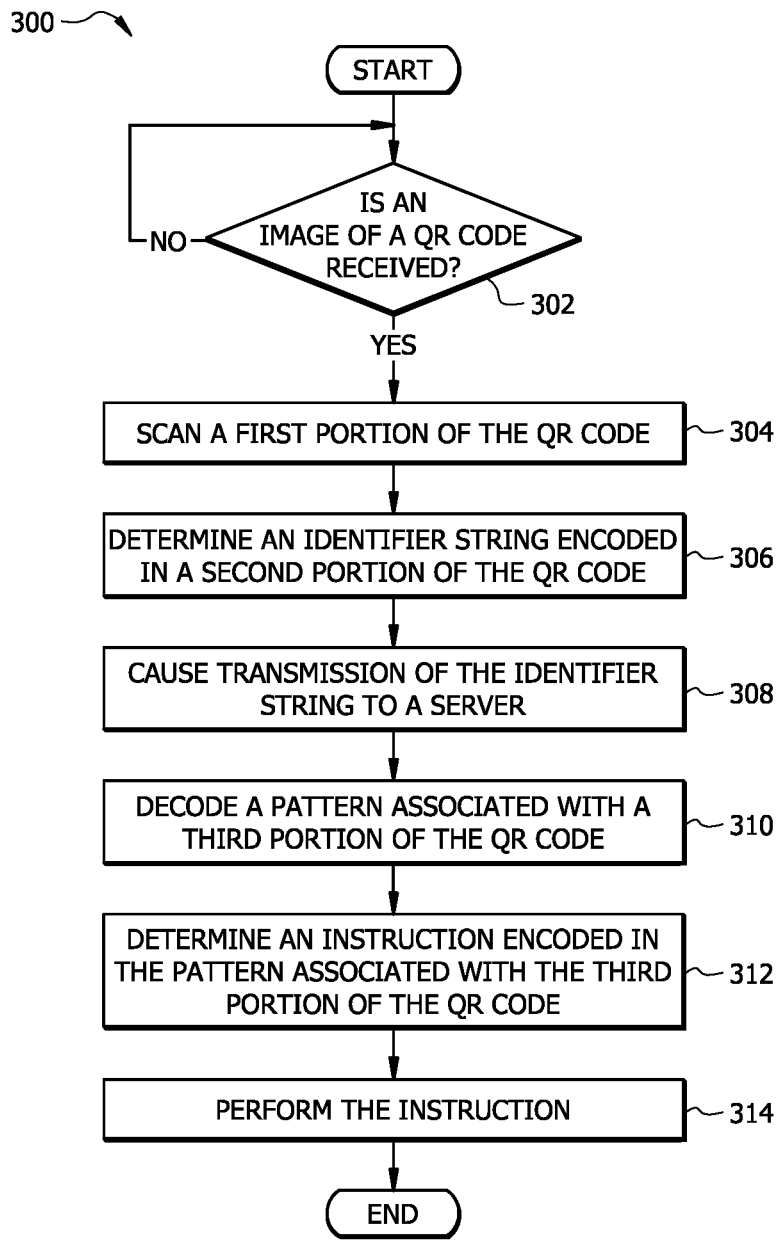
FIG. 3 illustrates an example flowchart of a method for implementing a dynamic operation identifier.

As described above, previous technologies fail to provide efficient and reliable solutions to implement dynamic operation identifiers. Embodiments of the present disclosure and its advantages may be understood by referring to FIGS. 1 through 3. FIGS. 1 through 3 are used to describe systems and methods to implement dynamic operation identifiers, according to some embodiments.

System Overview

FIG. 1 illustrates an embodiment of a system 100 that is generally configured to implement dynamic operation identifiers 104, and in response, reduce fraudulent activities using operation identifiers 104. In some embodiments, the system 100 comprises one or more user devices 120, one or more computing devices 140, and a server 160 operably coupled to one another by a network 110. Network 110 enables communication among the component of the system 100. The user device 120 comprises a processor 122 in signal communication with a memory 128. Memory 128 stores software instructions 130 that when executed by the processor 122 cause the processor 122 perform one or more operations of the user device 120 described herein. The computing device 140 comprises a processor 142 in signal communication with a memory 148. Memory 148 stores software instructions 150 that when executed by the processor 142 cause the processor 142 to perform one or more operations of the computing device 140 described herein. The server 160 comprises a processor 162 in signal communication with a memory 166. Memory 166 stores software instructions 168 that when executed by the processor 162 cause the processor 162 to perform one or more operations of the server 160 described herein. In other embodiments, system 100 may not have all of the components listed and/or may have other elements instead of, or in addition to, those listed above.

In general, system 100 reduces fraudulent activities related to operation identifiers 104. In some examples, operation identifiers 104 may include a quick response (QR) code, a bar code, a two-dimension image, a three-dimension image, and the like. The operation identifier 104 may interchangeably referred to herein as a QR code or a bar code. In current approaches, QR code is static—meaning that the QR code is printed or displayed as a non-changing image. Once a QR code is printed or displayed, it cannot be changed. In some cases, a bad actor may use a fake QR code that resembles a legitimate QR code. The fake QR code may lead users who scan the fake QR code to a phishing or malicious website designed to collect private information from the users. For example, the fake QR code may be placed on a banner, a poster, a flyer, or placed online. In some cases, a malicious QR code may be used to distribute malware or other harmful data to user devices that scan the malicious QR code. For example, when the malicious QR code is scanned, it may include a weblink address to a malware and initiate downloading the malware onto the user device. The malware may be coded to compromise the security of the user device and/or access private information on the user device and/or remotely control the user device. In some cases, a counterfeit QR code may be placed instead of a legitimate QR code. When the counterfeit QR code is scanned by a user device, it would cause the user device to communicate data to another computing device instead of an intended device as indicated by the legitimate QR code.

The present disclosure contemplates unconventional systems and methods to implement dynamic QR code 104 that is practically impossible to be replicated or otherwise accessed to perform fraudulent activities. For example, the dynamic QR code 104 is implemented by multiple encoding levels, where each encoding level is encoded in a different portion of the QR code 104 and provides information to decode a next respective portion of the QR code 104. See the description and operation associated with the multiple encoding levels 202a-c in FIG. 2. An encoding level is unique to each QR code 104 and should be verified by an external computing device (e.g., the server 160) before providing QR code pattern of a next respective portion of the QR code 104 and/or information encoded in a next respective portion of the QR code 104. In another example, different portions of the dynamic QR code 104 are revealed (e.g., displayed) when a respective previous portion is verified and decoded. Therefore, the possibility of accessing and counterfeiting a dynamic QR code 104 is significantly reduced by the disclosed implementation of dynamic QR code 104. In this manner, the disclosed system 100 provides the practical application of implementing a multi-level information encoding technology in an operation identifier 104, where each portion of the operation identifier 104 is encoded with a different information and in response to decoding a portion of operation identifier 104, a next portion is dynamically revealed (e.g., displayed). Therefore the system 100 reduces fraudulent activities performed by fake operation identifiers 104 and improves the security and privacy of user devices and user information stored at the user devices that could otherwise be accessed by fake operation identifiers 104.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

User Device

A user device 120 is generally any device that is configured to process data and interact with users 102. Examples of the user device 120 include but are not limited to, a personal computer, a desktop computer, a workstation, a server, a laptop, a tablet computer, a mobile phone (such as a smartphone), a virtual reality device, an augmented reality device, an Internet-of-Things (IOT) device, or any other suitable type of device. The user device 120 may include a user interface, such as a display, a microphone, a camera, a keypad, or other appropriate terminal equipment usable by users. The user device 120 may include a hardware processor 122 operably coupled with a network interface 124, camera 126, and memory 128, configured to perform any of the functions of the user device 120 described herein. The user device 120 is configured to communicate with other devices and components of the system 100 via the network 110. For example, the user device 120 may cause transmission of identifier string 134 from the computing device 140 to the server 160 by executing software instructions 130 via the network 110. In another example, the user device 120 may transmit the identifier string 134 to the server 160 via the network 110. In the same or another example, the user device 120 may transmit the identifier string 134 to the server 160 via the computing device 140, e.g., transmit the identifier string 134 to the computing device 140 and the computing device 140 may transmit the identifier string 134 to the computing device 140. The user device 120 may interchangeably be referred to herein as a computing device.

The user device 120 may be a scanning device that scans the QR code 104, where at least a portion of the QR code 104 is presented on the display screen 146 of the computing device 140 and the computing device 140 is within a threshold distance (e.g., 10 inches, 20 inches, etc.) from the user device 120. For example, when it is desired to scan the QR code 104, the user 102 may aim the camera 126 of the user device 120 toward the display screen 146 of the computing device 140 where at least a first portion of the QR code 104 is displayed. The camera 126 may capture the image 106 of the QR code 104 and transmit it to the processor 122 for processing. The processor 122 may use the receipt of the image 106 of the QR code 104 as a trigger to transmit instructions 138a,b to the computing device 140 to cause the computing device 140 to perform one or more of its functions described herein. This operation is described in FIG. 2 in greater detail.

Processor 122 comprises one or more processors. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 130) to perform the operations of the server 160 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-3. For example, the processor 122 may be configured to perform one or more operations of the operational flow 200 as described in FIG. 2 and one or more operations of the method 300 as described in FIG. 3.

Network interface 124 is configured to enable wired and/or wireless communications. The network interface 124 may be configured to communicate data between the user device 120 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

Camera 126 may be or include any camera that is configured to capture images of a field of view in front of the camera 126. Examples of the camera 126 may include charge-coupled device (CCD) cameras and complementary metal-oxide semiconductor (CMOS) cameras. The camera 126 is a hardware device that is configured to capture images 106 continuously, at predetermined intervals, or on-demand. For example, when the camera 126 is aimed toward the display screen 146 of the computing device 140, the camera 126 may capture the image 106 of at least a portion of the QR code 104 that is displayed on the display screen 146.

Memory 128 may be a non-transitory computer-readable medium. The memory 128 may be volatile or non-volatile and may comprise read-only memory (ROM), random-access memory (RAM), ternary content-addressable memory (TCAM), dynamic random-access memory (DRAM), and static random-access memory (SRAM). The memory 128 may include one or more of a local database, a cloud database, a network-attached storage (NAS), etc. The memory 128 comprises one or more disks, tape drives, or solid-state drives, and may be used as an over-flow data storage device, to store programs when such programs are selected for execution, and to store instructions and data that are read during program execution. The memory 128 may store any of the information described in FIGS. 1-3 along with any other data, instructions, logic, rules, or code operable to implement the function(s) described herein when executed by processor 122. For example, the memory 128 may store QR code scanner algorithm 136, software instructions 130, image 106 of the QR code 104, identifier string 176, QR code scanner algorithm 136, instructions 138a,b and/or any other data or instructions. The software instructions 130 may comprise any suitable set of instructions, logic, rules, or code operable to execute the processor 122 and perform the functions described herein, such as some or all of those described in FIGS. 1-3.

The QR code scanner algorithm 136 may be implemented by the processor 122 executing software instructions 130, and is generally configured to scan a QR code 104 and extract encoded data from the QR code 104. For example, the QR code scanner algorithm 136 may include an algorithm that is configured to decipher and decode patterns on the QR code 104. In some examples, the patterns may include black and white blocks, lines, shapes, and the like. The QR code scanner algorithm 136 may extract an electronic code that is embedded or encoded in the pattern of the QR code 104. In some embodiments, the QR code scanner algorithm 136 may use an optical character recognition (OCR) algorithm, an image processing algorithm, and the like, to perform its functions.

Computing Device

A computing device 140 is generally any device that is configured to process data and interact with users. Examples of the computing device 140 include but are not limited to, a personal computer, a desktop computer, a workstation, a server, a laptop, a tablet computer, a mobile phone (such as a smartphone), a virtual reality device, an augmented reality device, an Internet-of-Things (IoT) device, or any other suitable type of device. The computing device 140 may include a user interface, such as a display, a microphone, a camera, a keypad, or other appropriate terminal equipment usable by users. The computing device 140 may include a hardware processor 142 operably coupled with a network interface 144 and memory 148, configured to perform any of the functions of the computing device 140 described herein. The computing device 140 is configured to communicate with other devices and components of the system 100 via the network 110. For example, the computing device 140 may transmit the identifier string 134 to the server 160 in response to receiving instructions 138a from the user device 120.

Processor 142 comprises one or more processors. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 150) to perform the operations of the server 160 described herein. In this way, processor 142 may be a special-purpose computer designed to implement the functions disclosed herein. In an embodiment, the processor 142 is implemented using logic units, FPGAS, ASICs, DSPs, or any other suitable hardware. The processor 142 is configured to operate as described in FIGS. 1-3. For example, the processor 142 may be configured to perform one or more operations of the operational flow 200 as described in FIG. 2 and one or more operations of the method 300 as described in FIG. 3.

Network interface 144 is configured to enable wired and/or wireless communications. The network interface 144 may be configured to communicate data between the computing device 140 and other devices, systems, or domains. For example, the network interface 144 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

Display screen 146 may be an electronic monitor or screen that is configured to present or display items, images (e.g., images of the QR code 104), and the like. Examples of the display screen 146 may include liquid crystal display (LCD), light emitting diode (LED), organic LED (OLED), and the like.

Memory 148 may be volatile or non-volatile and may comprise ROM, (RAM, TCAM, DRAM, and SRAM. The memory 148 may include one or more of a local database, a cloud database, a NAS, etc. The memory 148 comprises one or more disks, tape drives, or solid-state drives, and may be used as an over-flow data storage device, to store programs when such programs are selected for execution, and to store instructions and data that are read during program execution. The memory 148 may store any of the information described in FIGS. 1-3 along with any other data, instructions, logic, rules, or code operable to implement the function(s) described herein when executed by processor 142. For example, the memory 148 may store software instructions 150, images 106 of the QR code 104, and/or any other data or instructions. The software instructions 150 may comprise any suitable set of instructions, logic, rules, or code operable to execute the processor 142 and perform the functions described herein, such as some or all of those described in FIGS. 1-3.

Server

Server 160 generally includes a hardware computer system generally configured to provide services and resources (e.g., data and/or hardware resources, such as QR code patterns 170) to other components and devices of the system 100. In some embodiments, the server 160 may be implemented by a cluster of computing devices, such as virtual machines. For example, the server 160 may be implemented by a plurality of computing devices using distributed computing and/or cloud computing systems in a network.

The server 160 comprises a processor 162 operably coupled with a network interface 164 and a memory 166. Processor 162 comprises one or more processors. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 168) to perform the operations of the server 160 described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 as described in FIG. 2 and one or more operations of the method 300 as described in FIG. 3.

Network interface 164 is configured to enable wired and/or wireless communications. The network interface 164 may be configured to communicate data between the server 160 and other devices, systems, or domains. For example, the network interface 164 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

Memory 166 may be volatile or non-volatile and may comprise ROM, (RAM, TCAM, DRAM, and SRAM. The memory 166 may include one or more of a local database, a cloud database, a network-attached storage (NAS), etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-3 along with any other data, instructions, logic, rules, or code operable to implement the function(s) described herein when executed by processor 162. For example, the memory 166 may store software instructions 168, QR code patterns 170, machine learning algorithm 172, training dataset 174, identifier string 176, and/or any other data or instructions. The software instructions 168 may comprise any suitable set of instructions, logic, rules, or code operable to execute the processor 162 and perform the functions described herein, such as some or all of those described in FIGS. 1-3.

QR code pattern 170 may include information about the pattern of at least a portion of the QR code 104. For example, the QR code pattern 170 may indicate binary numbers in rows and columns of a table, where binary number 1 may be indicated with a black-filled cell in the table and a binary number 0 amay be represented by a white-filled cell in the table. In other examples, the QR code pattern 170 may indicate hexadecimal numbers.

Machine learning algorithm 172 may be implemented by the processor 162 executing software instructions 168 and is generally configured to learn the associations between each identifier string 176 and respective QR code pattern 170, and predict a QR code pattern 170 for a given identifier string 176. In some embodiments, the machine learning algorithm 172 may include a support vector machine, neural network, random forest, k-means clustering, Tree-based algorithm, Random Forest algorithm, etc. In some embodiments, the machine learning algorithm 172 may include data processing and image processing machine learning algorithms that are configured to analyze the identifier strings 176 and QR code patterns 170. The machine learning algorithm 172 may be implemented by supervised, semi-supervised, and/or unsupervised machine learning.

For example, in a training stage, the machine learning algorithm 172 is given at least a part of the training dataset 174 and is asked to learn the relationship between each identifier string 176 and respective QR code pattern 170, and predict the corresponding QR code pattern 170 for a given identifier string 176. In this operation, the machine learning algorithm 172 may feed the identifier string 176 which is labeled with a respective QR code pattern 170 to a neural network. The neural network may extract the patterns (e.g., the pattern of numbers, symbols, etc.) in the identifier string 176 and form a first feature vector that represents the patterns of the identifier string 176. The neural network may also extract the patterns (e.g., the pattern of lines, shapes, etc.) of the QR code pattern 170 and form a second feature vector that represents the QR code pattern 170. The machine learning algorithm 172 may learn to associate the identifier string 176 to the respective QR code pattern 170. In a testing stage, the machine learning algorithm 172 may be given an identifier string 176 that is not labeled with a respective QR code pattern 170 and asked to predict the QR code pattern 170 for the identifier string 176. The machine learning algorithm 172 may perform similar operations as in the training stage to feed the identifier string 176 to the neural network and extract the pattern in the identifier string 176. The machine learning algorithm 172 may form a third feature vector from the patterns in the identifier string 176. The machine learning algorithm 172 may compare the identified third feature vector (associated with the unlabeled identifier string 176) with the first feature vector (associated with the labeled identifier string 176). The machine learning algorithm 172 may determine a similarity score between the first and third feature vectors. For example, the machine learning algorithm 172 may determine a Euclidean distance between the first and third feature vectors. If it is determined that the determined Euclidean distance is less than a threshold distance, the machine learning algorithm 172 may determine that the labeled identifier string 176 is similar to the unlabeled identifier string 176. In response, the machine learning algorithm 172 may associate the unlabeled identifier string 176 with the QR code pattern 170 that is associated with the labeled identifier string 176. In this manner, the machine learning algorithm 172 may predict the QR code pattern 170 for the unlabeled identifier string 176.

The training dataset 174 may include a set of pairs of identifier strings 176 and respective QR code pattern 170, where each identifier string 176 is labeled with a respective QR code pattern 170. The machine learning algorithm 172 may use the training dataset 174 to predict a QR code pattern 170 for a given identifier string 176, similar to that described above. For example, the training dataset 174 may include identifier string 176*a* which is labeled with QR code pattern 170*a*, and identifier string 176*n* which is labeled with QR code pattern 170*n*.

Operational Flow

FIG. 2 illustrates an example operational flow 200 of system 100 for implementing a dynamic QR code 104. In operation, the operational flow 200 may begin when the user device 120 scans the QR code 104. The operational flow 200 may include three levels of encoding, including first-level decoding 202*a*, second-level decoding 202*b*, and third-level decoding 202*c*. For example, assume that a user 204 wants to provide information to other users 102 via the QR code 104. The user 204 may encode the information into the QR code 104. The information may include a link to a webpage, an instruction to be performed, instructions to communicate data from the user device 120 to the computing device 140, instructions to communicate data from a first computing device associated with the user device 120 to a second computing device associated with the computing device 140, and the like. To this end, the user 204 may cause the QR code 104 (that is encoded with the desired information) to be displayed on the display screen (146 in FIG. 1) of the computing device 140. The user 204 may present the QR code 104 to the users 102. At this stage, in some embodiments, only a first portion 210*a* of the QR code 104 may be visible (e.g., have a QR code pattern) and the rest of the area of the QR code 104 may have not been displayed or formed yet. In response, the user 102 may aim the camera (126 in FIG. 1) of the user device 120 toward the display screen (146 in FIG. 1) of the computing device 140. The camera of the user device 120 may capture the image 106 of the first portion 210*a* of the QR code 104. The camera 126 (see FIG. 1) may send the captured image 106 of the first portion 210*a* of the QR code 104 to the processor 122 (see FIG. 1). In response, the user device 120 may use the captured image 106 of the first portion 210*a* of the QR code 104 as a trigger to perform one or more operations described herein. For example, the user device 120 may scan the first portion 210a of the QR code 104 by a QR code scanner algorithm 136.

Decoding a First Portion of the QR Code

In some embodiments, the first portion 210a of the QR code 104 may be encoded with information that may be configured to trigger the transmission of the instruction 138a from the user device 120 to the computing device 140 to display (e.g., reveal) at least a portion of the second portion 210b of the QR code 104. For example, the first portion 210a may have a pattern 214a that is encoded with the information that may be configured to trigger the transmission of the instruction 138a from the user device 120 to the computing device 140 to cause the computing device 140 to display the at least portion of the second portion 210b of the QR code 104.

In the first-level decoding 202a, the user device 120 may determine the pattern 214a of the first portion 210a of the QR code 104 and identify the information encoded in the pattern 214a. In response to identifying the information encoded in pattern 214a, the user device 120 may determine that this information indicates to send instruction 138a to the computing device 140. Thus, the user device 120 may communicate instructions 138a to the computing device 140, where the instructions 138a may cause the computing device 140 to display at least a portion of the second portion 210b of the QR code 104. For example, the instructions 138a may cause the computing device 140 to display the portion 210b of the QR code 104. The portion 210b of the QR code 104 may be encoded with identifier string 176. Thus, when the portion 210b is scanned, the identifier string 176 may be determined. Thus, the user device 120 may identify the identifier string 176 encoded in the portion 210b in response to scanning the first portion 210a of the QR code 104. In this manner, in response to scanning the first portion 210a of the QR code 104, the first pattern 214a in the first portion 210a is decoded. In some embodiments, because scanning the first portion 210a leads to identifying the identifier string 176, the identifier string 176 may be associated with at least a portion of the first pattern 214a.

Decoding a Second Portion of the QR Code

The user device 120 may use the identification of the identifier string 176 as a trigger to send the instruction 138b to the computing device 140. The instructions 138b may cause the computing device 140 to communicate the identifier string 176 to the server 160. For example, the portion 210b of the QR code 104 may have a pattern 214b that is encoded with the information that is configured to trigger the transmission of the instructions 138b from the user device 120 to the computing device 140. Thus, in the second-level decoding 202b, the user device 120 may determine the pattern 214b of the portion 210b of the QR code 104 and identify the identifier string 176 encoded in the pattern 214b. In response to identifying the identifier string 176, the user device 120 may send the instructions 138b to the computing device 140. In this manner, the user device 120 may cause the transmission of the identifier string 176 from the computing device 140 to the server 160.

Decoding a Third Portion of the QR Code

In the third-level decoding 202c, the pattern 170 of the third portion 210c of the QR code 104 is determined. The server 160 may determine or identify the QR code pattern 170 that is associated with the identifier string 176. For example, the server 160 may maintain a repository of identifier strings 176, each associated with a respective QR code pattern 170. Thus, in this example, the server 160 may search among the identifier strings 176 to identify the received identifier string 176. In response, the server 160 may determine the QR code pattern 170 associated with the identifier string 176. Each identifier string 176 may be unique to a respective QR code 104.

In some embodiments, if the received identifier string 176 is not found among the stored identifier strings 176, the server 160 may use the machine learning algorithm 172 to predict the QR code pattern 170 for the identifier string 176. In some embodiments, the server 160 may predict the QR code pattern 170 for the received identifier string 176 by feeding the identifier string 176 to the machine learning algorithm 172 to extract patterns in the identifier string 176 and compare the extracted patterns with each pattern of the labeled identifier string 176, similar to that described in FIG. 1.

In some embodiments, the server 160 may dynamically generate the QR code pattern 170 based on the received identifier string 176 and the instructions 216. For example, in such embodiments, the server 160 may feed the received identifier string 176 to the machine learning algorithm 172 to extract the pattern in the identifier string 176. The server 160 may then use the extracted pattern to form a pattern vector. The server 160 may compare the pattern vector with each pattern vector associated with the identifier strings 176 in the training dataset 174. The server 160 may identify a particular identifier string 176 (from the training dataset 174) that has the closest pattern to the received identifier string 176. The server 160 may generate a new QR code pattern 170 for the received identifier string 176 based on the QR code pattern 170 that is associated with the particular identifier string 176 (from the training dataset 174), the instruction 216, and received identifier string 176. For example, the server 160 may generate the new QR code pattern 170 that has a corresponding relationship with the received identifier string 176 as the particular identifier string 176 (from the training dataset 174) has with its respective QR code pattern 170.

In response to determining or predicting the QR code pattern 170 for the received identifier string 176, the server 160 may communicate a pattern 214c of the third portion 210c of the QR code 104 to the computing device 140, where the pattern 214c may correspond to the predicted or determined QR code pattern 170. In response, the computing device 140 may display (e.g., reveal) the QR code pattern 170 in the third portion 210c of the QR code 104. In this manner, information that indicates the QR code pattern 170 associated with the third portion 210c of the QR code 104 may be received at the computing device 140. Thus, the QR code pattern 170 may be displayed on the third portion 210c of the QR code 104 in response to receiving the information that indicates the pattern 170, for example, at the computing device 140 and/or user device 120.

In certain embodiments, information that indicates the QR code pattern 170 associated with the third portion 210c of the QR code 104 may be communicated to the user device 120 and the user device 120 may communicate the pattern 170 to the computing device 140. In certain embodiments, now that the pattern 170 is presented on the third portion 210c of the QR code 104, the user 102 may use the user device 120 to capture another image 106 of the QR code 104, where the image 106 shows the complete pattern of the QR code 104. In response, the user device 120 may decode the pattern 170 on the third portion 210c, e.g., by a QR code pattern decoding algorithm that may be included in the software instructions 130. The decoded QR code pattern 170 may include any information and/or instruction. For example, the decoded QR code pattern 170 may include instructions 216 to be performed and/or information to be accessed. Thus, in response to decoding the QR code pattern 170, the user device 120 may determine the instructions 216 and perform the instruction 216.

In some embodiments, the identifier string 176 may be a decryption key that, upon validation by the server 160, may be used to display the pattern 170 on the third portion 210c of the QR code 104.

In some embodiments, the portion 210d may be displayed in response to the second portion 210b being decoded and instruction 138b being sent to the computing device 140. In some embodiments, the portion 210b may be encoded with a decryption key 218 that, upon validation by the server 160, may be used in determining and displaying the pattern 170 on the third portion 210c of the QR code 104.

Although the operational flow 200 is described with respect to a QR code, it is understood that any operation identifier, such as bar code, a two-dimension image, a three-dimension image may be used to perform similar operation.

Method for Implementing Dynamic QR Code

FIG. 3 illustrates an example flowchart of a method 300 for implementing dynamic QR code 104 according to some embodiments of the present disclosure. Modifications, additions, or omissions may be made to method 300. Method 300 may include more, fewer, or other operations. For example, operations may be performed in parallel or in any suitable order. While at times discussed as the system 100, user device 120, computing device 140, server 160, or components of any of thereof performing operations, any suitable system or components of the system may perform one or more operations of the method 300. For example, one or more operations of method 300 may be implemented, at least in part, in the form of software instructions 130, 150, 168 of FIG. 1, stored on tangible non-transitory computer-readable medium (e.g., memory 128, 148, 166 of FIG. 1) that when run by one or more processors (e.g., processor 122, 142, 162 of FIG. 1) may cause the one or more processors to perform operations 302-314.

At operation 302, the user device 120 determines whether an image 106 of a QR code 104 is received. If it is determined that the image 106 of the QR code 104 is received, the method 300 proceeds to operation 304. Otherwise, the method 300 remains at operation 302.

At operation 304, the user device 120 scans a first portion 210a of the QR code 104. For example, the user device 120 may implement a QR code scanning algorithm 136 to scan the first portion 210a of the QR code 104.

At operation 306, the user device 120 determines an identifier string 176 encoded in a second portion 210b of the QR code 104. For example, the user device 120 may communicate the instruction 138a to the computing device 140 which, among other functions, causes the computing device 140 to display the pattern 214b of the second portion 210b of the QR code 104. The user device 120 may capture the image 106 of the pattern 214b and decode it. The pattern 214b may be encoded with the identifier string 176.

At operation 308, the user device 120 causes transmission of the identifier string 176 to the server 160. For example, the user device 120 may communicate the instruction 138a that, among other functions, causes the transmission of the identifier string 176 to the server 160.

At operation 310, the user device 120 decodes the pattern 170 associated with the third portion 210c of the QR code 104. For example, the user device 120 may capture an image 106 of the third portion 210c of the QR code 104 and decode the pattern 170, similar to that described in FIG. 2.

At operation 312, the user device 120 determines an instruction 216 encoded in the pattern 170 associated with the third portion 210c of the QR code 104. For example, the decoded pattern 170 may provide or indicate the instruction 216. Thus, the user device 120 may determine the instructions 216 in response to decoding the pattern 170. At operation 314, the user device 120 may perform or execute the instruction 216.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for implementing dynamic quick response (QR) code, comprising:
   a memory configured to store an image of a quick response (QR) code; and
   a processor operably coupled with the memory, and configured to:
   scan a first portion of the QR code;
   in response to scanning the first portion of the QR code, determine an identifier string encoded in a second portion of the QR code;
   cause transmission of the determined identifier string to a server, wherein in response to causing the transmission of the determined identifier string to the server, information that indicates a first pattern associated with a third portion of the QR code is received from the server;
   decode the first pattern associated with the third portion of the QR code, where the decoded first pattern of the QR code indicates an instruction to be performed; and
   in response to decoding the first pattern associated with the third portion of the QR code:
   determine the instruction in response to decoding the third portion of the QR code; and
   perform the instruction.

2. The system of claim 1, wherein in response to scanning the first portion of the QR code, a first pattern in the second portion of the QR code is decoded, wherein the identifier string is associated with at least a portion of the first pattern.

3. The system of claim 1, wherein the first pattern associated with the third portion of the QR code is dynamically generated based at least in part upon the instruction and the identifier string.

4. The system of claim 1, wherein to cause the transmission of the determined identifier string to the server, the processor is further configured to communicate an instruction that causes the transmission of the identifier string to the server to a computing device.

5. The system of claim 1, wherein the instruction indicates to communicate a particular data from a first computing device to a second computing device.

6. The system of claim 1, wherein:
in response to scanning the first portion of the QR code, a second pattern is displayed on the second portion of the QR code; and
the second pattern is associated with the identifier string.

7. The system of claim 1, wherein in response to receiving the information that indicates the first pattern in the QR code, the first pattern is displayed on the third portion of the QR code.

8. A method for implementing dynamic quick response (QR) code, comprising:
scanning a first portion of the QR code;
in response to scanning the first portion of the QR code, determining an identifier string encoded in a second portion of the QR code;
causing transmission of the determined identifier string to a server, wherein in response to causing the transmission of the determined identifier string to the server, information that indicates a first pattern associated with a third portion of the QR code is received from the server;
decoding the first pattern associated with the third portion of the QR code, where the decoded first pattern of the QR code indicates an instruction to be performed; and
in response to decoding the first pattern associated with the third portion of the QR code:
determining the instruction in response to decoding the third portion of the QR code; and
performing the instruction.

9. The method of claim 8, wherein in response to scanning the first portion of the QR code, a first pattern in the second portion of the QR code is decoded, wherein the identifier string is associated with at least a portion of the first pattern.

10. The method of claim 8, wherein the first pattern associated with the third portion of the QR code is dynamically generated based at least in part upon the instruction and the identifier string.

11. The method of claim 8, wherein causing the transmission of the determined identifier string to the server is in response to communicating an instruction that causes the transmission of the identifier string to the server to a computing device.

12. The method of claim 8, wherein the instruction indicates to communicate a particular data from a first computing device to a second computing device.

13. The method of claim 8, wherein:
in response to scanning the first portion of the QR code, a second pattern is displayed on the second portion of the QR code; and
the second pattern is associated with the identifier string.

14. The method of claim 8, wherein in response to receiving the information that indicates the first pattern in the QR code, the first pattern is displayed on the third portion of the QR code.

15. A non-transitory computer-readable medium storing instructions that, when executed by a processor, cause the processor to:
scan a first portion of a quick response (QR) code;
in response to scanning the first portion of the QR code, determine an identifier string encoded in a second portion of the QR code;
cause transmission of the determined identifier string to a server, wherein in response to causing the transmission of the determined identifier string to the server, information that indicates a first pattern associated with a third portion of the QR code is received from the server;
decode the first pattern associated with the third portion of the QR code, where the decoded first pattern of the QR code indicates an instruction to be performed; and
in response to decoding the first pattern associated with the third portion of the QR code:
determine the instruction in response to decoding the third portion of the QR code; and
perform the instruction.

16. The non-transitory computer-readable medium of claim 15, wherein in response to scanning the first portion of the QR code, a first pattern in the second portion of the QR code is decoded, wherein the identifier string is associated with at least a portion of the first pattern.

17. The non-transitory computer-readable medium of claim 15, wherein the first pattern associated with the third portion of the QR code is dynamically generated based at least in part upon the instruction and the identifier string.

18. The non-transitory computer-readable medium of claim 15, wherein to cause the transmission of the determined identifier string to the server, the processor is further configured to communicate an instruction that causes the transmission of the identifier string to the server to a computing device.

19. The non-transitory computer-readable medium of claim 15, wherein the instruction indicates to communicate a particular data from a first computing device to a second computing device.

20. The non-transitory computer-readable medium of claim 15, wherein:
in response to scanning the first portion of the QR code, a second pattern is displayed on the second portion of the QR code; and
the second pattern is associated with the identifier string.

* * * * *